(12) United States Patent
Bui et al.

(10) Patent No.: US 9,608,750 B2
(45) Date of Patent: Mar. 28, 2017

(54) TUNNEL FOLLOW-UP MESSAGE FOR TRANSPARENT CLOCK

(75) Inventors: Dinh Thai Bui, Nozay (FR); Michel Le Pallec, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 706 days.

(21) Appl. No.: 13/990,300

(22) PCT Filed: Oct. 25, 2011

(86) PCT No.: PCT/EP2011/068654
§ 371 (c)(1),
(2), (4) Date: Oct. 11, 2013

(87) PCT Pub. No.: WO2012/072343
PCT Pub. Date: Jun. 7, 2012

(65) Prior Publication Data
US 2014/0036936 A1    Feb. 6, 2014

(30) Foreign Application Priority Data

Dec. 1, 2010    (EP) .................................... 10290634

(51) Int. Cl.
*H04J 3/06*    (2006.01)
*H04L 29/06*    (2006.01)

(52) U.S. Cl.
CPC .......... *H04J 3/0638* (2013.01); *H04J 3/0664* (2013.01); *H04L 63/123* (2013.01)

(58) Field of Classification Search
CPC .................................................. H04J 3/0664
See application file for complete search history.

(56) References Cited

U.S. PATENT DOCUMENTS 7,164,652 B2 *   1/2007   Puppa ................ H04L 41/0668
                                                          370/225
8,804,736 B1 *   8/2014   Drake ................... H04L 12/462
                                                          370/392
(Continued)

FOREIGN PATENT DOCUMENTS

CN    101425890 A    5/2009
CN    101827098 A    9/2010

OTHER PUBLICATIONS

Treytl, A. et al. "Securing IEEE 1588 by IPsec Tunnels—An Analysis". Institute of Electrical and Electronics Engineers, p. 83-90; Sep. 2010; xp031780849.
(Continued)

*Primary Examiner* — Guang Li
(74) *Attorney, Agent, or Firm* — Harness, Dickey & Pierce, P.L.C.

(57) ABSTRACT

A method for handling at least one encapsulated synchronization message by a tunnel node including a transparent clock, includes generating a signature from the encapsulated synchronization message and generating, or updating if it has already been generated, a tunnel follow-up message. The tunnel follow-up message includes the encapsulated synchronization message signature. The method further includes measuring the encapsulated synchronization message residence time across the tunnel node, and updating the correction field of the tunnel follow-up message with the measured residence time.

17 Claims, 2 Drawing Sheets

(56) References Cited

U.S. PATENT DOCUMENTS

| | | | | |
|---|---|---|---|---|
| 8,914,662 | B2* | 12/2014 | Guo | H04J 3/0673 713/600 |
| 9,042,411 | B1* | 5/2015 | Hutchison | H04J 3/065 370/509 |
| 2003/0112748 | A1* | 6/2003 | Puppa | H04L 41/0668 370/217 |
| 2005/0213513 | A1* | 9/2005 | Ngo | H04L 12/4641 370/254 |
| 2006/0062218 | A1* | 3/2006 | Sasagawa | H04L 45/04 370/389 |
| 2006/0203717 | A1* | 9/2006 | Puppa | H04L 12/2602 370/216 |
| 2009/0003223 | A1* | 1/2009 | McCallum | H04L 12/4633 370/244 |
| 2009/0113070 | A1* | 4/2009 | Mehta | H04L 12/2697 709/238 |
| 2011/0200051 | A1* | 8/2011 | Rivaud | H04J 3/0641 370/400 |
| 2011/0222412 | A1* | 9/2011 | Kompella | H04L 45/00 370/241.1 |
| 2011/0305307 | A1* | 12/2011 | Wang | H04J 3/0667 375/362 |
| 2012/0051374 | A1* | 3/2012 | Obradovic | H04J 3/0697 370/503 |
| 2012/0072761 | A1* | 3/2012 | Guo | H04J 3/0673 713/600 |

OTHER PUBLICATIONS

Jobert, S. "Issues with the Transparent Clock concept of PTPv2 in a telecom environment". ltu-T Drafts, International Telecommunication Union; Geneva; Study Group 15, pp. 1-5; Oct. 2010; xp017448523.

Davari, S. et al."Transporting PTP messages (1588) overMPLS Networks;draft-davari-tictoc-1588overmpls-OO.txt". Internet Engineering Task Force , IETF, pp. 1-13; Geneva; Sep. 2010; xp015071277.

Xu, Y. et al. "IPsec security for packet based synchronization; draft-xu-tictoc-ipsec-security-for-synchronization-OO.txt". Internet Engineering Task Force, IETF, pp. 1-13; Geneva; Oct. 2010; xp015071736.

International Search Report PCT/ISA/210 for PCT/EP2011/068654 dated Nov. 30, 2011.

Written Opinion PCT/ISA/237 for PCT/EP2011/068654 dated Nov. 30, 2011.

* cited by examiner

TUNNEL FOLLOW-UP MESSAGE FOR TRANSPARENT CLOCK

This application is the national phase under 35 U.S.C. §371 of PCT International Application No. PCT/EP2011/068654 which has an International filing date of Oct. 25, 2011, which claims priority to European patent application number 10290634.4 filed Dec. 1, 2010; the entire contents of each of which are hereby encorporated by reference.

FIELD OF THE INVENTION

This invention relates generally to the technical field of synchronization transfer using the IEEE Standard 1588™-2008 protocol, also called as Precision Time Protocol (PTP).

BACKGROUND OF THE INVENTION

As telecommunication data transmission is increasingly reliant on packet-based networks (e.g. Ethernet, MPLS/IP), robust methods for time and frequency synchronization within these networks are more and more required. By synchronization, a way of distributing common time and frequency references to network clocks, embedded within network nodes, in order to align their time and frequency scales, is meant.

Precision Time Protocol (PTP), standardized by the IEEE (Institut of Electrical and Electronics Engineers), is one of the most up-to-date standard that addresses synchronization problem within packet-based networks. In fact, PTP was designed as an improvement on current time synchronization technologies such as Network Time Protocol (NTP).

PTP is a packet-based protocol relying on the measurement of the communication path delay between a time source, designated as a master clock, and a receiver, designated as a slave clock.

PTP has first introduced Boundary Clock (BC) concept, but very soon with the development of packet-based networks, a plurality of BC limitations have been pointed out, especially with regards to the possible number of cascaded BCs in a synchronization chain. Indeed, it is shown that the synchronization transfer over a long chain of BCs can result in a large phase error accumulation. Such error is mainly due to

- PTP message exchanges between different pairs of successive BCs in the chain which may not necessarily be syntonized (synchronized in frequency); as well as,
- gain peaking and noise generation in phase-locked loop servos at the successive BCs.

Thus, as an alternative to BC, a recent concept, called Transparent Clock (TC) was specified in a second release (PTPV2) mainly with the goal of bypassing cascade scalability issue.

In principle, a TC simply provides corrections for the PTP packet residence time across the network node (i.e. a bridge, a router, a switch, a repeater, or the like). The residence time corresponds here to the time needed by a PTP event message to propagate from an ingress port to an egress port of the network node. To that end, TC proceeds with:

- PTP event messages (Sync, Delay_req, Delay_Res for example) identification;
- their residence time computing (Both ingress and egress timestamps are recorded and saved to calculate the residence time);
- updating a newly introduced time-interval field within PTP event messages (named CF for Correction Field); and subsequently
- forwarding, just as an ordinary switch, these modified PTP event messages.

Accordingly, one can retain that TC forwards PTP event message but after modifying it, though keeping in mind what CF modification may induce.

Hence, as soon as tunneling and encapsulation are evoked, several problems with regard to PTP event messages modification arise. In fact, the ability to modify a PTP packet (or more generally, a PTP event message) encapsulated within a tunnel raises several concerns and issues. Among those problems, one can mention:

- the modification of encapsulated PTP event messages raises the concern of layer violation as it contradicts the principle of encapsulation itself which aims to protect encapsulated data from being modified by intermediate nodes of the tunnel. The document "*Issues with the Transparent Clock concept of PTPv2*", France Telecom, ITU-T SG15/Q13 interim meeting, 16 Mar.-20 Mar. 2009, San Jose reveals such a problem. Regarding this matter, a given network node is allowed to modify a packet payload only if its address is the destination address of the packet. Otherwise, the node violates the layer separation principle;
- the modification itself may be impossible: any modification of the PTP packet content requires the creation of a new packet with all the initial encapsulation headers and recomputed checksums. However, intermediate nodes of a tunnel often do not comprise all the protocol stacks implemented for this purpose. For example, SDH equipments in the middle of an Ethernet-over-SDH (EoS) tunnel are not likely to have an Ethernet protocol stack implemented in order to regenerate the Ethernet header and especially to recompute the Ethernet Frame Check Sequence (FCS) (e.g. in a Frame-mapped Generic Framing Procedure (GFP) as defined by the ITU-T G.7041). Indeed, the modification of the correction field within the encapsulated PTP message requires the recomputation of all FCSs (e.g. both Ethernet FCS and GFP FCS in an EoS encapsulation context) in order to avoid the whole encapsulating frame from being discarded at reception;
- in the case of IPSec tunneling or, more generally, of encryption use, the modification of the encapsulated PTP packet content, by intermediate nodes, simply reveals as an impossible task (as the encryption key is not distributed to intermediate nodes for security reasons).

It is one object of the present invention to overcome at least one of the aforementioned problems and to offer advantages over the prior art.

Another object of the present invention is to overcome at least one of the aforementioned problems without adding relatively complex circuitries to conventional TCs.

Another object of the present invention is to avoid layer violation while timing messages are handled by TCs.

Another object of the present invention is to allow TC deployment within encapsulation/tunneling embodiments, or more generally wherever it is impossible to modify timing messages.

Another object of the present invention is to permit TC deployment on an intermediate node within a tunnel, whatever its ability to access to PTP event message content.

Another object of the present invention is to permit TC deployment across encrypted tunnels within PTP networks.

Another object of the present invention is to provide a method for TC deployment across IPSec tunnels.

DESCRIPTION OF THE DRAWING

The objects, advantages and other features of the present invention will become more apparent from the following disclosure and claims. The following non-restrictive description of preferred embodiments is given for the purpose of exemplification only with reference to the accompanying drawings in which like reference characters refer to similar elements and in which

Figure 1:
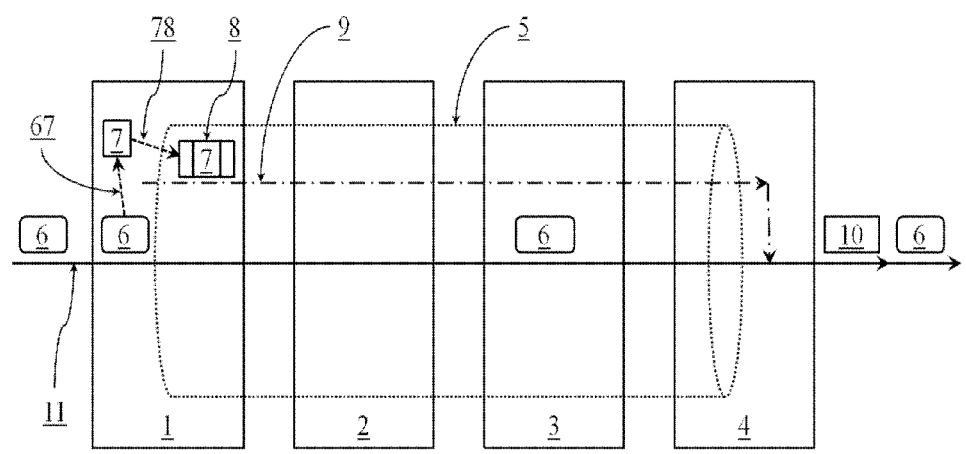
FIG. 1 is a block diagram showing an illustrative embodiment relating to layer violation avoidance.

It is to be noted that numeral references do not connote, here, any particular order or hierarchy, and are used only for referencing purpose.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key of critical elements of the invention or to delineate the scope of the invention. Its sole purpose is to present some concepts in a simplified form as a prelude to the more detailed description that is discussed later.

The present invention relates to a method for handling at least one encapsulated synchronization message by a tunnel node including a transparent clock, said method comprising the following steps:

generating a signature from the encapsulated synchronization message;

generating, or updating if it has already been generated, a tunnel follow-up message which includes the encapsulated synchronization message signature;

measuring the encapsulated synchronization message residence time across the tunnel node;

updating the correction field of the tunnel follow-up message with the aforementionned measured residence time.

In accordance with a broad aspect, the synchronization message is tagged with a class of service value.

In accordance with another broad aspect, the tunnel follow-up message is comprised within a maintenance message.

In accordance with another broad aspect, the synchronization message is encrypted.

In accordance with another broad aspect, the synchronization message is transported within nested tunnels.

The present invention further relates to a tunnel node including a transparent clock and comprising means for generating a signature from an incoming encapsulated synchronization message.

In accordance with a broad aspect, a hash function, as a mean for generating a signature from the incoming encapsulated synchronization message, is provided.

Advantageously, the generated signature binds unambiguously and uniquely the tunnel follow-up message to its associated synchronization message (e.g. PTP event message).

Advantageously, the tunnel-follow up message may be modified by tunnel intermediate nodes without breaking the layer separation principle.

While the invention is susceptible to various modification and alternative forms, specific embodiments thereof have been shown by way of examples in the drawings. It should be understood, however, that the description herein of specific embodiments is not intended to limit the invention to the particular forms disclosed.

It may of course be appreciated that in the development of any such actual embodiments, implementation-specific decisions should be made to achieve the developer's specific goal, such as compliance with system-related and business-related constraints. It will be appreciated that such a development effort might be time consuming but may nevertheless be a routine understanding for those or ordinary skill in the art having the benefit of this disclosure.

DETAILED DESCRIPTION OF ILLUSTRATIVE EMBODIMENTS

With reference to FIG. 1, there is shown a tunnel 5 materialized by a MPLS LSP (Multi-Protocol Label Switching—Label Switch Path) through a plurality of node 1-4 within a packet-based network.

The tunnel 5 end nodes are the tunnel head-end node 1 and the tunnel tail-end node 4. Both nodes 1 and 4 are of the LER (Label Edge Router) type.

The tunnel intermediate nodes 2-3 are of the LSR (Label Switching Router) type. The tunnel 5 may comprise none intermediate node, an intermediate node, or a plurality of intermediate nodes.

All nodes 1-4 of the tunnel 5 comprise conventional TCs functionalities.

According to one embodiment and within the context of TCs deployment, the handling of a PTP event message 6 comprises:

forwarding the PTP event message 6 without any modification and within its original data path 11 (i.e. keeping the synchronization signal within the original data path 11, following the data traffic), but tagged with a distinctive mark;

generating a new message 8 in such a way that it can be read and modified by intermediate nodes (TCs) 2-3; and associating in a bijective way the generated message 8 to the forwarded PTP event message 6.

In one embodiment, the PTP event message 6 is tagged with a dedicated CoS (Class of Services) value. Thus, tunnel intermediate nodes 2-3 recognize PTP event messages 6 on the basis of dedicated CoS value tagged thereon. The CoS value may be transported within the MPLS label 3-bit EXP field (Cf. IETF RFC 3032).

Alternatively, the PTP event message 6 may be tagged with a message type flag, or with a message identifier, or a specific dedicated MPLS label.

In one embodiment, the generated message is a Tunnel Follow-up Message (TFM) 8, valid only within the tunnel 5 boundaries. TFM 8 is somewhat similar to PTPV2 standard follow-up message, except that TFM 8 does not follow the same data path 11 as its associated PTP event message 6 (also called as synchronization message). In other words, TFM 8 is not conveyed in the same tunnel 5 as its correspondent PTP event message 6. TFM 8 is routed on path 9 which includes the tunnel 5 nodes.

According to another aspect of TFM 8, it is transported or encapsulated so that the intermediate nodes 2-3 of the tunnel 5 can modify its CF (Correction Field) without breaking the layer separation principle. To that end, TFM 8 is transported, for example, within a "modified" OAM (Operations Administration and Maintenance) LSP traceroute message so that the CF of the TFM 8 may be modified at each intermediate node 2-3, namely at each hop by each traversed LSR (alternatively, each traversed LSR can communicate the associated event message residence time in the same manner as it communicates its own IP system address in a standard traceroute procedure). It is worth to mention, here, that there is no layer violation as traceroute procedures use Time-to-Live (TTL) expiry to address intermediate nodes (IP traceroute, OAM LSP traceroute for example).

The TFM 8 comprises a plurality of additional TLVs (Type-Length-Value structures), such as Event Message Signature 7 TLV (EMS-TLV) including a signature of the associated event message 6. EMS-TLV permits to unambiguously and uniquely binding the TFM 8 to its associated event message 6;

Event Message Type TLV (EMT-TLV) indicating the type of the associated event message 6 (Sync, Delay_Req, Delay_Res for example);

Tunnel Routing Information TLV (TRI-TLV) allowing intermediate nodes (i.e. TCs) 2-3 to route the TFM 8 following the same path taken by the tunnel 5. As non-limitative examples, the TRI-TLV may contain the tunnel 5 IP destination address in the case of a GRE tunnel, or an Explicit Route Object (ERO) in the case of a MPLS tunnel;

Tunnel Level TLV (TL-TLV) allowing the deployment of TFM concept to multiple levels of encapsulations/tunnels. TL-TLV indicates the level of encapsulation associated to the tunnel conveying the event messages 6. This tunnel level is a configuration parameter which may be provided by the operator at each tunnel end node.

The event message signature 7 may be obtained from the event message 6 according to a plurality of methods, such as by using a hash function of the encapsulated event message 6 (MD5 or SHA-2 for example);

the event message 6 sequence number or more generally any bijective function of at least a distinctive feature of the PTP event message 6 (synchronization sequence number, synchronization sequence number+type for example), if the intermediate LSRs 2-3 are provided with means for this feature snooping or the content of the PTP event message 6 is not encrypted.

In a preferred embodiment, the event message signature 7 is hash function of the entire encapsulated PTP event message 6.

With reference to FIG. 1 and according to disclosed embodiments, TCs deployment within tunnel 5 comprises the following steps:

generating, at the tunnel head-end node 1, an event message signature 7 from the incoming PTP event message 6 (arrow 67 on FIG. 1);

forwarding, without modification, the incoming PTP event message 6;

generating a TFM 8 including the event message signature 7 (arrow 78 on FIG. 1) within the EMS-TLV;

updating, in an additive manner, the correction field (CF) of TFM 8 with the residence time of the PTP event message across the tunnel node;

transporting the generated TFM 8 in a traceroute 9, preferably in a "modified" OAM LSP traceroute 9;

at the tunnel tail-end node 4, the TFM 8 message is converted into a standard Follow-up message 10 containing the cumulated residence times across different Transparent Clocks embedded in traversed network nodes. This later follows now the same data path as the associated event message. Alternatively, the cumulated residence times within the TFM 8 CF can be copied to the CF of the associated event message.

Figure 2:
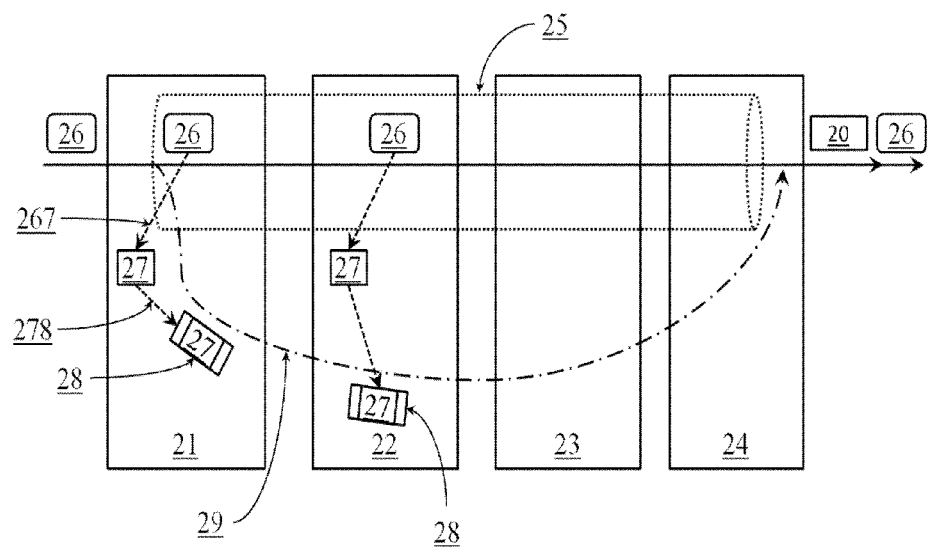
FIG. 2 is a block diagram showing an illustrative embodiment relating to encrypted tunnels.

In one embodiment illustrated in FIG. 2 and aiming, among others, at TCs deployment in a ciphering context, an encrypted tunnel 25 (an IPSec tunnel 25 for example) is created between the output port of the tunnel head-end node 21 to the input port of the tunnel tail-end node 24. The encrypted tunnel 25 encapsulates all data flows, including PTP event message 26, passing through intermediate nodes 22-23.

Tunnel intermediate nodes 22-23 recognize encapsulated PTP event messages 26 on the basis of distinctive mark tagged thereon. In one embodiment, PTP event messages 26 are tagged with dedicated CoS value transported within the DSCP (Differentiated Services CodePoint) field within the IPSec header.

With reference to FIG. 2, TCs deployment within an encrypted tunnel 25 comprises the following steps:

encapsulating, by the tunnel head-end node 21 at the level of its input port, of incoming PTP event message 26 into the IPSec tunnel 25;

generating an event message signature 27 (arrow 267 on FIG. 2) from the encapsulated/encrypted PTP event message 26, using, for example, a hash function, then forwarding the encapsulated/encrypted PTP event message 26 to the output port of the tunnel head-end node 21;

generating, by the tunnel head-end node 21, a TFM 28 based on the encapsulated/encrypted PTT event message 26 and including the event message signature 27 generated therefrom (arrow 278 on FIG. 2);

transmitting the generated TFM 28, toward tunnel intermediate nodes 22-23 (Both, the encapsulated PTP event message 26 and TFM 28 traverse, here, an unsecured portion of the network);

upon reception of the encapsulated PTP event message 26 and then of the TFM 28 (the reception order can be reversed), at the tunnel intermediate node 22, the following actions are performed by this node 22:

detecting the encapsulated PTP event message 26 on the basis of the dedicated CoS value in the IPSec header;

generating the associated event message signature 27;

measuring the event message 26 residence time;

storing the so-generated event message signature 27 and the so-measured residence time in a dedicated memory entry (taking care, beforehand, of launching a validity timer, the expiry of the timer triggers the erasure of the memory entry);

receiving and identifying, on the basis of the event message signature 27, the TFM 28 that is associated to the above encapsulated PTP event message 26, thanks to the content of TFM 8 EMS-TLV;

updating the identified TFM 28 correction field with the so-measured residence time;

reading the TRI-TLV in order to forward the TFM 28 towards the next node following the same path as the IPSec tunnel 25.

performing the above steps at each traversed tunnel intermediate node 23, in the same way as it is performed by the tunnel intermediate node 22;

upon reception of both encapsulated PTP event message 26 and its associated TFM 28 at the tunnel tail-end node 24, then the following actions are performed by this later node 24:

de-encapsulating the PTP event message 26 from the IPSec tunnel 25, at the tunnel tail-end node 24 input port;

recording the PTP event message 26 residence time;

sending the de-encapsulated PTP event message 26 to the output port of the tunnel tail-end node 24;

generating a standard Follow-up message 20 (two-step mode, according to conventional TC standard) using the content of the TFM 28, especially adding to the correction field (CF) of the later message the so-recorded cumulated residence time and writing the total value into the new Follow-up message 20 correction field;

sending the Follow-up message 20 to the output port of the tunnel tail-end node 24, following, this time, the same data path as the one of the associated event message 26.

As in the above embodiments, the generated TFM 28 within the IPSec tunnel 25 may include more than one TLV such as:

EMS-TLV containing a signature 27 generated from the encapsulated PTP event message 26. It allows tunnel intermediate nodes 22-23 to unambiguously associate the TFM 28 with the PTP event message 26. It is to be noted that the later message is encrypted within the IPSec tunnel 25 so that its content (e.g. sequence number) cannot be read by tunnel intermediate nodes 22-23;

EMT-TLV indicating the type of the associated PTP event message 26 (Sync, Delay_Req, Delay_Resp for example); this allows for generation the concept to other event messages than Sync message.

TRI-TLV aiming at conveying the TFM 28 in a secure manner (it is to be stressed that the data may cross an un-secure portion of the network). It can be decided to make use of an available and dedicated transport channel (e.g. a Slow Protocol channel in case of Ethernet) in a link-by-link basis. In this case, the TRI-TLV can contain, for example, the IPSec tunnel destination address so that the TFM 28 can be routed at each tunnel intermediate node 23-24 and can follow the same path as the IPSec tunnel 25;

TL-TLV indicating the tunnel level. In the case shown on FIG. 2, tunnel level is set to 1, as there is only a single level of encapsulation in this example.

A tunnel intermediate node 22-23 or the tunnel tail-end node 24 may receive the TFM 28 before the associated PTP event message 26. In this case, this tunnel node 22-24 buffers the TFM 28 while waiting for the reception its associated PTP event message 26. A validity timer is launched and the expiry of this timer triggers the erasure of the TFM 28 from the buffer.

Figure 3:
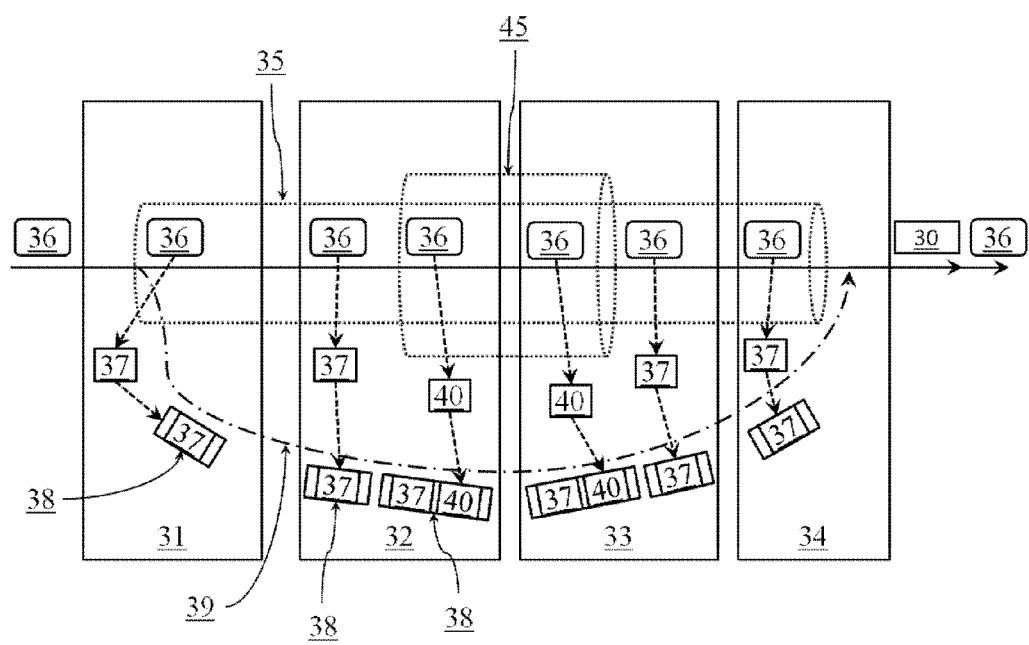
FIG. 3 is a block diagram showing an illustrative embodiment relating to nested tunnels.

In another embodiment illustrated in FIG. 3, TFM mechanism is used in the case of a multiple levels of tunnels/encapsulations. This case outlines the utility of TL-TLV.

In fact, TL-TLV is used to indicate the level associated to a TFM. The tunnel level can be manually configured by the operator, but can also be automatically managed (e.g. automatically increased at the tunnel ingress end node and decreased at the tunnel egress end node).

As an example, the level-1-tunnel can be a GRE tunnel and the level-2-tunnel can be an IPSec tunnel (central segment (node 32-node 33) is supposed to be un-secured). In this case, level-1 signature of the encapsulated PTP event message (i.e. in node 1) may be the message sequence number and level-2 signature (in node 32) may be a hash function of the encrypted PTP event message 36.

With reference to FIG. 3, the TFM 38 is generated by the tunnel head-end node 31 of tunnel 35 (level-1) which includes therein a first event message signature 37 obtained from the encapsulated PTP event message 36;

is then modified to contain a second event message signature 40 generated by the tunnel head-end node 32 (being also a tunnel intermediate node within the tunnel 35) of the tunnel 45 (level-2) on the basis of the encrypted (i.e. IPSec ciphering) PTP event message 36;

exits the level-2 tunnel 45 while getting rid of the level-2 event message signature 40 and retaining level-1 event message signature 37 relative to the level-1 tunnel 35;

traverse, from the output port of the tunnel tail-end node of the tunnel 45, the remaining nodes of the tunnel 35 with only the event message signature 37.

As illustrated in FIG. 3, the level-2 event message signature 40 is concatenated to the level-1 event message signature 37. Alternatively, the former event message signature 40 may replace the later event message signature 37 in order to reduce the TFM size.

The skilled person should understand that those teachings may be extended to more than two nested tunnels wherein a PTP even message may undergo successive encapsulations/de-encapsulations.

TCs embedded within the tunnel nodes described above, are provided with required means for TFM generation and handling. Such means may include
  means for generating a TFM;
  means for generating an event message signature using for example a hash function.

It is to be noted that herein described method and system are independent of TC type, whatever an end-to-end or a peer-to-peer one.

At this time, it is noteworthy to mention that the herein described embodiments are not limited to PTPv2. The skilled person should understand those teachings may concern any other synchronization protocol, or any further version of PTP making use TCs. Hence, the expression "PTP event message", cited above, may be substituted by "synchronization event message", "timing message", or more generally "synchronization message".

The invention claimed is:

1. A method for handling at least one encapsulated synchronization message by a tunnel node including a transparent clock, the method comprising:
  generating at least one encapsulated synchronization message signature from the at least one encapsulated synchronization message;
  generating a tunnel follow-up message, or updating the tunnel follow-up message when the tunnel follow-up message has already been generated, the tunnel follow-up message including the at least one encapsulated synchronization message signature, and the tunnel follow-up message being included within a modified operations administration and maintenance (OAM) label switch path (LSP) tracercute message;
  measuring at least one encapsulated synchronization message residence time across the tunnel node; and
  updating, at an intermediate tunnel node, a correction field of the tunnel follow-up message with the measured at least one encapsulated synchronization message residence time.

2. The method of claim 1, wherein the generating the at least one encapsulated synchronization message signature comprises:
generating the at least one encapsulated synchronization message signature based on a hash function of the at least one encapsulated synchronization message.

3. The method of claim 1, wherein the generating the at least one encapsulated synchronization message signature comprises:
generating the at least one encapsulated synchronization message based on a bijective function of at least a distinctive feature of the at least one encapsulated synchronization message.

4. The method of claim 3, wherein the distinctive feature of the at least one encapsulated synchronization message is a synchronization sequence number.

5. The method of claim 1, wherein the tunnel follow-up message further includes an event message signature type-length-value (EMS-TLV).

6. The method of claim 1, wherein the tunnel follow-up message further includes a tunnel level type-length-value (TLV).

7. The method of claim 1, wherein the tunnel follow-up message further includes a tunnel routing information type-length-value (TRI-TLV).

8. The method of claim 1, wherein the at least one encapsulated synchronization message is encrypted.

9. The method of claim 1, wherein the measuring of the at least one encapsulated synchronization message residence time across the tunnel node includes buffering the tunnel follow-up message at the tunnel while awaiting receipt of the at least one encapsulated synchronization message.

10. The method of claim 1, further comprising:
converting the tunnel follow-up message to a standard follow-up message when the tunnel node is a tunnel tail-end node, the standard follow-up message including an updated correction filed of the tunnel follow-up message.

11. The method of claim 1, wherein the at least one encapsulated synchronization message is a Precision Time Protocol event message.

12. An intermediate tunnel node, comprising:
at least one processor configured to execute computer readable instructions to,
generate at least one encapsulated synchronization message signature from at least one incoming encapsulated synchronization message,
generate a tunnel follow-up message, or updating the tunnel follow-up message when the tunnel follow-up message has already been generated, the tunnel follow-up message including the at least one encapsulated synchronization message signature, and the tunnel follow-up message being included within a modified operations administration and maintenance (OAM) label switch path (LSP) traceroute message,
measure at least one encapsulated synchronization message residence time across the intermediate tunnel node, and
update a correction field of the tunnel follow-up message with the measured at least one encapsulated synchronization message residence time.

13. The intermediate tunnel node of claim 12, wherein the at least one processor is further configured to execute the computer readable instructions to generate the at least one encapsulated synchronization message signature using a hash function.

14. A method for handling at least one encapsulated synchronization message by an intermediate tunnel node including a transparent clock, the method comprising
one of generating and updating, at the intermediate tunnel node, a tunnel follow-up message, the tunnel follow-up message including at least one encapsulated synchronization message signature, and the tunnel follow-up message being included within a modified operations administration and maintenance (OAM) label switch path (LSP) traceroute message, the at least one encapsulated synchronization message signature based on the at least one encapsulated synchronization message;
measuring, at the intermediate tunnel node, at least one encapsulated synchronization message residence time across the intermediate tunnel node; and
updating, at the intermediate tunnel node, a correction field of the tunnel follow-up message with the measured at least one encapsulated synchronization message residence time.

15. The method of claim 14, further comprising:
generating the at least one encapsulated synchronization message signature based on a hash function of the at least one encapsulated synchronization message.

16. The method of claim 14, further comprising:
generating the at least one encapsulated synchronization message based on a bijective function of at least a distinctive feature of the at least one encapsulated synchronization message.

17. The method of claim 14, wherein the tunnel follow-up message includes an event message signature type-length-value (EMS-TLV).

* * * * *